United States Patent Office 2,958,802
Patented Nov. 1, 1960

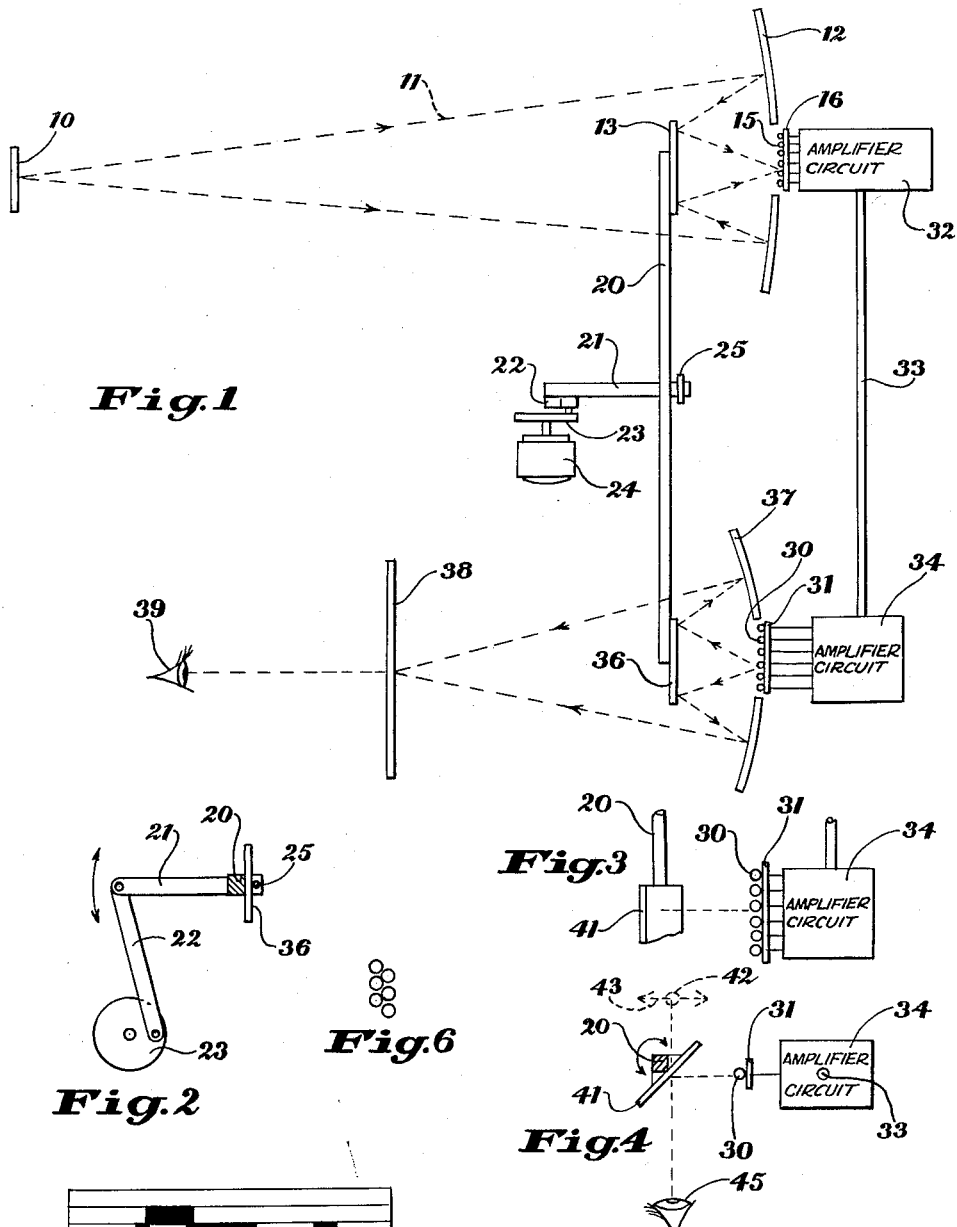

2,958,802

INFRARED VIEWER

Gustaf W. Hammar, deceased, late of Rochester, N.Y., by Louise B. Hammar, executrix, and Charles F. Gramm, Rochester, N.Y., assignors, by mesne assignments, to the United States of America as represented by the Secretary of the Navy Filed Aug. 23, 1955, Ser. No. 530,219

1 Claim. (Cl. 313—101)

This invention relates to a method and apparatus for viewing an infrared image, for example, for viewing a warm body in total darkness by its own radiation. For example, one can easily see a human being in total darkness by the radiation of the human body itself.

The object of the invention is to provide an infrared viewer of simple construction capable of providing a fairly high degree of resolution and extremely high sensitivity.

The invention uses infrared sensitive photoconductive cells such as lead sulfide cells. It avoids the use of a complete scanning system such as used in television and, on the other hand, avoids the need for a separate photoconductive cell for each point of the image. According to the invention a vertical row of infrared sensitive photoconductive cells are supported in a plane and a suitable optical system such as a concave mirror is arranged to focus an image of the infrared emitting target in the plane of the cells. The words vertical and horizontal are used here merely relative to one another and do not necessarily refer to any orientation in absolute space.

The image focusing system also includes a vertical plane mirror mounted to oscillate about a vertical axis so as to cause the image to sweep back and forth horizontally across the row of photoconductive cells. Also, according to the invention, a vertical row of glow lamps with a one-to-one correspondence to the cells is provided. The individual cells are connected to the corresponding lamps in such a way that a lamp will glow only when the cell is illuminated with infrared radiation (above some predetermined threshold value, of course). The light from the glow lamps also strikes an oscillating vertical mirror which is rotated synchronously with the one in the cell system. This second vertical mirror may be part of a projection system to project a real image of the glow lamps on a viewing screen or it may be used alone in which case the observer merely views the virtual image of the glow lamps as seen in this second vertical mirror. In either case an image of the glow lamps is formed in the viewing plane and the oscillation of the second mirror causes the image of the glow lamps to sweep back and forth in the viewing plane so as to have a horizontal dimension determined by the amount of sweep.

The invention and its objects will be fully understood from the following description when read in connection with the accompanying drawing in which:

Fig. 1 is a schematic vertical section of a preferred embodiment of the invention;

Fig. 2 is a plan view of one detail of Fig. 1;

Figs. 3 and 4 are respectively vertical and horizontal sections of a viewing system alternative to that employed in Fig. 1; and Fig. 5 shows a teakettle as seen by the present invention;

Fig. 6 shows an array of glow lamps as used in a modified embodiment of the invention.

In Fig. 1 infrared radiation from an object or target 10 as represented by broken lines 11 is focused by a concave mirror 12 and a plane mirror 13 in a vertical plane. In this plane a vertical row of photoconductive cells 15 is supported by a panel 16. Only six such cells are shown but any number may be used and in practice 30 such cells have been found to give adequate resolution for most detection and recognition purposes. The vertical plane mirror 13 is supported by a vertical rod 20 which is rotatable about a vertical axis through a pivot 25. An arm 21 on this vertical rod 20 is moved back and forth, particularly as shown in Fig. 2 by a motor 24 which rotates a disc 23 which through linkage 22 is connected to the end of the arm 21 to rotate it about the pivot 25.

A vertical row of glow lamps 30 is carried on a panel 31 with each lamp corresponding to one of the cells in the vertical row 15. The cell circuit 32 is connected through a multiple cable 33 to the glow lamp circuit 34 so that each lamp 30 glows only when the corresponding cell 15 receives infrared radiation above some predetermined threshold value, i.e., only when the cell 15 is illuminated by an infrared image. Light from the glow lamps 30 is focused by a plane mirror 36 and a concave mirror 37 onto a rear projection viewing screen 38 which may be viewed by the eye 39 of an observer. The mirror 36 is carried on the rod 20 to be oscillated about a vertical axis synchronously with the mirror 13. This causes the image of the cells 30 to sweep back and forth horizontally on the screen 38 and thus to appear to have a horizontal dimension equal to the amount of sweep.

In practice it is not necessary to have a projection system, especially since the glow lamp system normally uses fairly large units and the vertical dimension of the row of glow lamps themselves is quite large and quite adequate for direct viewing. Accordingly, the arrangement shown in Figs. 3 and 4 is preferable, because of its simplicity. The mirror 41 mounted at 45° to the position of the mirror 36 replaces the mirror 36. Thus the mirror 41 forms a virtual image 42 of the vertical row of glow lamps 30. Rotation of the shaft 20 back and forth causes the mirror 41 to oscillate as before and hence to stretch the virtual image 42 horizontally as shown by the broken line 43. The eye 45 of an observer sees a complete image in the plane 43, the horizontal dimension of which is measured by the sweep.

The image shown in Fig. 5 may be either that projected on the screen 38 in Fig. 1 or that seen at 43 in Fig. 4. In Fig. 5 the image of a teakettle is represented and even with only six cells and six glow lamps, the vertical resolution is adequate to display the simple teakettle. A system employing 30 cells and 30 glow lamps will adequately display a full length figure of a human being showing various details of clothing, such as a tie or a cufflink. The lines in the image between adjacent glow lamps are not objectionable and, in any case, may be eliminated by locating the lamps slightly staggered as in Fig. 6 with the cells similarly located. Such cells and lamps are still substantially in a vertical row as far as the present invention is concerned; the essential feature is that they are located in equivalent positions.

We claim:

An infrared image display device comprising a plurality of infrared sensitive photoconductive cells arranged in a substantially vertical row, an optical system including a first concave mirror and a first plane vertical mirror for focusing an infrared image approximately into the plane occupied by said cells, means for rigidly supporting said first mirror in front of said concave mirror and in front of said cells for directing said infrared image to said plane occupied by said cells, means for oscillating said support means and said first mirror about a vertical axis to move said infrared image back and forth horizontally across said row of cells, a substantially vertical row of glow lamps equal in number to the number of said cells and having positions corresponding to the positions of said cells, an amplifier circuit connecting each cell to the corresponding lamp including means for causing the lamp to glow only when the cell is illuminated by infrared radiation of intensity above a threshold value, a second optical system including a second concave mirror and a second plane vertical mirror for presenting an image of said row of lamps in a viewing plane, said second mirror being rigidly supported on said support means in front of said second concave mirror and in front of said row of lamps and being oscillated about said axis parallel to said row of glow lamps in synchronism with the oscillation of said first mirror whereby said image of said glow lamps is moved back and forth in said viewing plane to present a visible image corresponding to said infrared image in said viewing plane.

References Cited in the file of this patent

UNITED STATES PATENTS

| | | |
|---|---|---|
| 1,762,470 | Crowe | June 10, 1930 |
| 2,028,475 | Rockwell | Jan. 21, 1936 |
| 2,225,097 | Cawley | Dec. 17, 1940 |
| 2,234,328 | Wolff | Mar. 11, 1941 |
| 2,395,099 | Cage | Feb. 19, 1946 |
| 2,403,066 | Evans | July 2, 1946 |
| 2,422,971 | Kell et al. | June 24, 1947 |
| 2,451,734 | Hopkins | Oct. 19, 1948 |
| 2,623,183 | Buck | Dec. 23, 1952 |